United States Patent Office 3,472,068
Patented Oct. 14, 1969

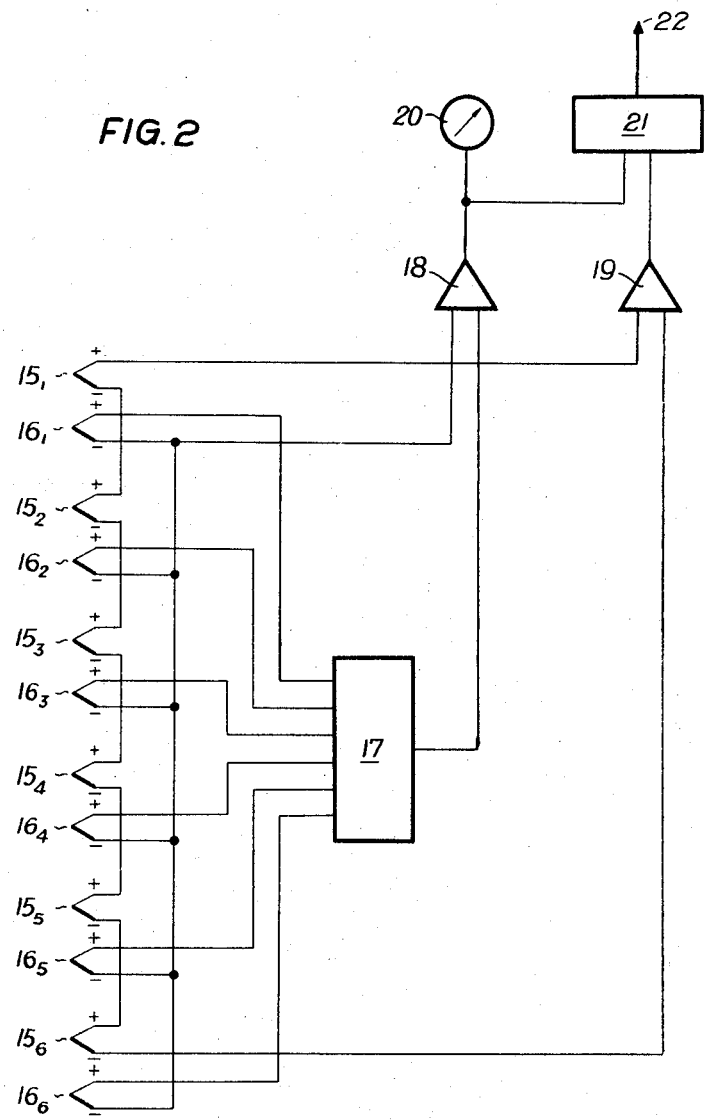

3,472,068
DEVICE FOR THE MONITORING OF MECHANICAL AND THERMAL STRESSES OF INTERNAL COMBUSTION ENGINES
Hans List, 126 Heinrichstrasse, Graz, Austria, and Reimar Germann, Graz, Austria; said Germann assignor to said List
Filed July 19, 1967, Ser. No. 654,399
Claims priority, application Austria, July 21, 1966, A 7,008/66
Int. Cl. G01n 25/20
U.S. Cl. 73—116                                     7 Claims

ABSTRACT OF THE DISCLOSURE

A device for monitoring of mechanical and thermal stresses of internal combustion engines and to determine uniform load-distribution for the cylinders, including a temperature sensor in the exhaust pipe for each cylinder and a differential voltage comparator to compare temperature with an indicator.

---

Figure 1:
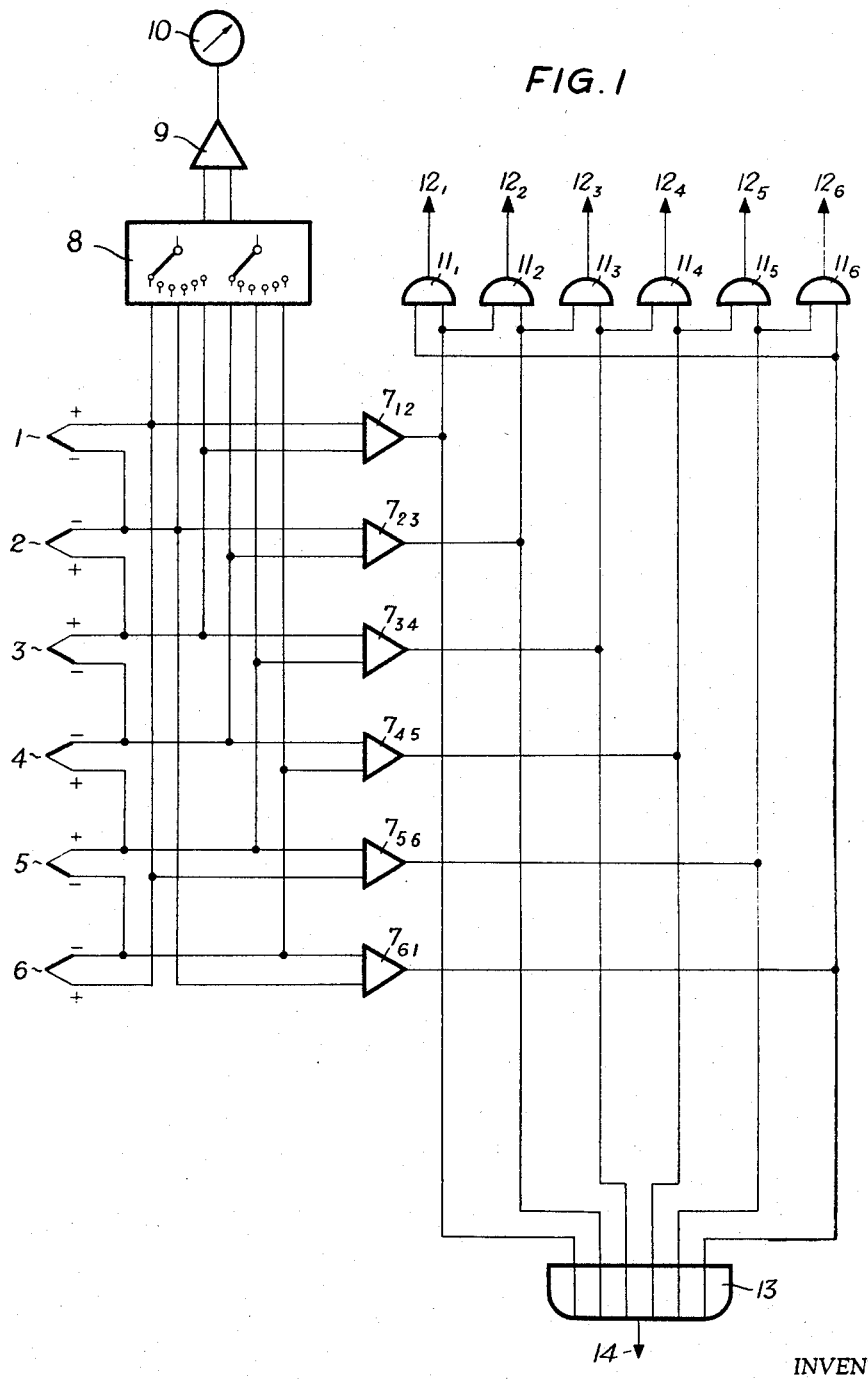

This invention relates to a device for the monitoring of mechanical and thermal stresses of internal combustion engines and of the load-distribution among their cylinders.

Permanent monitoring of multi-cylinder engines, particularly of diesel engines and gas machines is desirable in order to detect defects occurring in operation before major damage has been caused. In addition, monitoring is required to ascertain whether mechanical and thermal stresses are well within admissible limits and approximately equal in individual cylinders and whether, particularly with gas engines for example, intolerable pressure peaks as revealed by knocking in the cylinders occur. Moreover, it is advisable to continuously check uniform distribution of the load among the various cylinders of the engine, and in particular, whether any cylinder has broken down or fails to produce its rated output.

In the past, dependable and economically reasonable monitoring has been handicapped by the multitude of factors to be taken into account and by shortcomings of the monitoring equipment available. It is the purpose of the invention to provide a device which can be manufactured and operated at reasonable cost and by its particular design makes continuous operation practically possible.

The basic idea of the invention refers to the fact that both monitoring of the mechanical and thermal stresses of the engine and uniform load-distribution among the various cylinders is possible by measuring the waste gas temperatures of individual cylinders and comparing these temperatures with one another or with a mean value. While such variations of the waste gas temperatures as may be due to the overall load of the engine are not here considered, such differences between the waste gas temperatures as are revealed by this method point to abnormal mechanical or thermal stresses or to a difference in the load of individual cylinders. According to the invention, the monitoring device for each cylinder comprises one or a plurality of temperature feelers located in the exhaust pipe and a differential connection comparing the temperature of each individual cylinder with that of the remaining cylinders or with the mean temperature and actuating a warning and/or stop mechanism in the event of the temperature of the waste gases of any one or several cylinders differing irrespective of the absolute temperature of the waste gases.

Further details of the invention will appear from the following description of two embodiments of the invention with reference to the accompanying drawings in which:

FIGS. 1 and 2 show block wiring diagrams of two embodiments of the invention as applied to a six-cylinder engine. However, the invention can be appropriately applied to machines comprising any number of cylinders.

With reference to the embodiment of the invention illustrated in FIG. 1 one thermocouple, designated by reference numbers 1 to 6, is incorporated in the exhaust pipe of each cylinder, the connections of the said thermocouples being alternatingly connected with homopolar poles, that is, the negative pole of the first thermocouple is connected with the negative pole of the following second thermocouple 2, the positive pole of which is connected with the positive pole of the following third thermocouple 3, and so forth with alternating polarities.

The positive pole of the first thermo-couple 1 and the positive pole of the second thermo-couple 2 are connected with the two inputs of a voltage comparator $7_{12}$ so that the difference between the thermoelectric voltages of the two thermocouples is rendered operative. Accordingly, the negative pole of the second thermocouple 2 and the negative pole of the third thermocouple 3 are connected with the two inputs of the second voltage comparator $7_{23}$. The positive and negative poles of the thermocouples 1 to 6 are alternatingly connected to the analogous inputs of the voltage comparators $7_{34}$ to $7_{61}$. The outputs of the voltage comparators are connected with the inputs of six associated AND gates $11_1$ to $11_6$, each of them having two inputs, on the one hand, and with the six inputs of an OR-gate 13 on the other hand. Furthermore, the individual poles of the thermocouples are connected to a selector switch 8 by means of which one thermocouple each can be selectively connected with the input of a measuring amplifier 9, thus making it possible to record the temperature of the associated cylinder by means of the recording instrument 10.

As long as identical temperatures prevail at the various measuring points 1 to 6, no output signal will be released at the output of the voltage comparators $7_{12}$ to $7_{61}$. The thermoelectric voltages of the opposing thermocouples hereabove described cancel each other out at the input of the voltage comparator. If, however, one or several temperatures vary by a certain amount which has to be above the threshold voltage of the voltage comparator, an input signal is relaased at the output of two or more voltage comparators.

One input of each AND-gate is connected with the input of the following and the other input with the input of the preceding AND-gate, whch means that the first input of the AND-gate $11_1$ is connected with one input of the preceding AND-gate $11_6$ and the second input of the AND-gate $11_1$ is connected with one input of the following AND-gate $11_2$.

In the event of a variation of one of the thermoelectric voltages, such as of the thermocouple 2 for example, the voltage comparator $7_{23}$ and the voltage comparator $7_{12}$ for example, will release an output signal. Thus a signal will appear at both inputs of the AND-gate $11_2$, whereas as the output of the AND-gate $11_2$ an output signal $12_2$ will be available. This can be used for the operation of an acoustic or optical alarm on the one hand, and directly for stopping the monitored machine, on the other hand.

All outputs of the voltage comparators $7_{12}$ to $7_{61}$ are connected with the six inputs of an OR-gate 13 so that irrespective of the place where the variation has occurred, a signal 14 will appear at the output of the OR-gate 13. The same may be used either for summation or for stopping the machine. However, ths method offers no clue as to which cylinder was responsible for the release of the signal. Therefore, unless an indication of the faulty cylinder is required, the AND-gates $11_1$ to $11_6$ might be dispensed with. If the threshold voltage of the difference comparators $7_{12}$ to $7_{61}$ should be excessively high, the same may be preceded by amplifiers in order to improve the acoustic sensibility.

Resistance temperature feelers may be used in lieu of the thermocouples 1 to 6, provided each element is fed with a voltage of its own. The rest of the circuit will be as hereabove described.

With reference to the embodiment of the inventon illustrated in FIG. 2, two thermocouples $15_1$ to $15_6$ and $16_1$ to $16_6$ respectively, are located in each exhaust pipe. This setup also meets the requirements mentioned in the preamble. Although two thermocouples are required for each cylinder, the need for subsequent switchgear is less than with the setup shown in FIG. 1.

Via a selector switch 17 the signals of the thermocouples $16_1$ to $16_6$ are fed to a measuring amplifier 18, where they are amplified and recorded by means of a measuring instrument 20 on the one hand, and fed to a differential connection 21 on the other hand. The thermocouples $15_1$ to $15_6$ are electrically connected in series with their ends connected to a measuring amplifier 19 whose amplification is regulated in such a manner that it amounts to one sixth only of the amplification of the measuring amplifier 18 (in the present example referring to a six-cylinder engine, otherwise one divided by the number of cylinders), thus causing the summation signal equalling the mean exhaust temperature to appear at the output of the amplifier 19. However, it is also possible to use an amplifier 19 whose amplification equals that of the amplifier 18, while providing for a division of voltage at the output of the amplifier 19 via resistors so as to obtain a value equal to one divided through the number of cylinders. This signal is also fed to the differential connection 21 where it is compared with the temperature prevailing in each cylinder, and if this is at variance, a signal 22 is released at the output. This can be used for optical or acoustic warning or else for stopping the engine. The differential connection 21 is preferably designed as a voltage comparator of the differential type.

With ths setup it is likewise possible to use resistance temperature sensors provided appropriate power sources are available.

The selector switch 17 can either operate automatically after every rotation of the monitored machine via a slide-type register the number of steps which equals the number of cylinders, or else be actuated by means of a synchronous motor or a stepping switch.

We claim:
1. A device for monitoring mechanical and thermal stresses of internal combustion engines and of the uniform load-distribution among their cylinders, comprising a thermocouple located in each exhaust pipe of each cylinder of the internal combustion engine, a plurality of voltage comparators with an equal number of AND-gates and an OR-gate, wherein the homopolar connections of the said thermocouples are alternately connected with each other on the one hand, and with one of the voltage comparators each on the other hand, the outputs of the said voltage comparators being connected with the OR-gate on the one hand, an alarm signal being released at the output of the said OR-gate in the event of at least one defect, and with one of the said AND-gates on the other hand, each of the AND-gates having two inputs, one of which is connected with the input of the following, and the other with the input of the preceding AND-gate, at least one signal being released at the outputs of the AND-gates if the temperature of the exhaust gases of at least one cylinder is at variance, the said signals indicating the cylinder whose exhaust gases have a temperature differing from the mean value on the one hand, and being available for use in connection with a means for stopping the engine, on the other hand.

2. A device according to claim 1, in which a thermocoupleis located in each exhaust pipe, a plurality of voltage comparators with an equal number of AND-gates and an OR-gate, wherein the homopolar connections of the said thermocouples, are alternatingly connected with each other on the hand, and by an amplifier with one of the voltage comparators each on the other hand, the outputs of the said voltage comparators being connected with the OR-gate on the one hand, an alarm signal being released at the output of the said OR-gate in the event of at least one defect of the cylinder, and with one of the said AND-gates on the other hand, each of the AND-gates having two inputs one of which is connected with the input of the following, and the other with the input of the preceding AND-gate, at least one signal being released at the output of the AND-gates if the temperature of the exhaust gases of at least one cylinder is at variance, the said signals indicating the cylinder whose exhaust gases have a temperature which is different from the mean value on the one hand, and being available for use in connection with a means for stopping the engine, on the other hand.

3. A device according to claim 1, in which a thermocouple is located in each exhaust pipe, a plurality of voltage comparators with an equal number of AND-gates and an OR-gate, wherein the homopolar connections of the said thermocouples are alternatingly connected with each other on the one hand, and with one of the voltage comparators each on the other hand, the outputs of the said voltage comparators being connected with the OR-gate on the one hand, a signal being released at the output of the said OR-gate in the event of at least one defect of the cylinders, each of the AND-gates having two inputs, one of which is connected with the input of the following, and the other with the input of the preceding AND-gate, at least one signal being released at the outputs of the AND-gates if the temperature of the exhaust gases of at least one cylinder is at variance, the said signals indicating the cylinder whose exhaust gases have a temperature which is different from the mean value on the one hand, and being available for use in connection with a means for stopping the engine, on the other hand.

4. A device according to claim 1, in which a thermocouple is located in each exhaust pipe, a plurality of voltage comparators with an equal number of AND-gates and an OR-gate, wherein the homopolar connections of the said thermocouples are alternately connected with each other on the one hand, and with one of the voltage comparators each on the other hand, the outputs of the said voltage comparators being connected with the OR-gate on the one hand, a signal being released at the output of the said OR-gate in the event of at least one defect of the cylinders, and with one of the said AND-gates on the other hand, each of the AND-gates having two inputs, one of which is connected with the input of the following, and the other with the input of the preceding, AND-gate, at least one signal being released at the outputs of the AND-gates if the temperature of the exhaust gases of at least one cylinder is at variance, the said signals indicating the cylinder whose exhaust gases have a temperature which is different from the mean value on the one hand, and being available for use in connection with a means for stopping the engine, on the other hand.

5. A device according to claim 1, in which a selector switch, a measuring amplifier and a differential voltage comparator are provided wherein two thermocouples are located in each exhaust pipe, a first thermocouple being connected by the selector switch with the measuring amplifier whose output is connected to the input of the differential voltage comparator, the second thermocouples of each exhaust pipe being electrically connected in series, the two extremities being connected with the measuring amplifier whose amplification is set to an amount equal to one divided by the number of cylinders, the output of the said measuring amplifier being connected with the second input of the differential voltage comparator so that if at least one temperature differs from the mean value a signal is released at the output of the differential voltage comparator, and a ring counter, the selector switch stepping up automatically after each revolution of the monitored engine by the said ring counter, the number of steps of which equals the number of cylinders.

6. A device according to claim 1, in which a selector switch, a measuring amplifier and a differential voltage comparator are provided, two thermocouples being located in each exhaust pipe, a first thermocouple connected by the selector switch with the measuring amplifier whose output is connected to the input of the differential voltage comparator, the second thermocouple of each exhaust pipe being electrically connected in series, the two extremities being connected, with the measuring amplifier, whose amplification is set to an amount equal to one divided by the number of cylinders, the output of the said measuring amplifier being connected with the second input of the differential voltage comparator so that if at least one temperature differs from the mean value, a signal is released at the output of the differential voltage comparator, a change-over switch and a synchronous motor, the selector switch stepping up automatically after each revolution of the monitored engine by means of the change-over switch actuated by the synchronous motor.

7. A device according to claim 1, in which a selector switch, a measuring amplifier and a differential voltage comparator are provided, two thermocouples being located in each exhaust pipe, a first thermocouple being connected by the selector switch with the measuring amplifier whose output is connected to the input of the differential voltage comparator, the second thermocouple of each exhaust pipe being electrically connected in series, the two extremities being connected with the measuring amplifier whose amplification is set to an amount equal to one divided by the number of cylinders, the output of the said measuring amplifier being connected with the second input of the differential voltage comparator, so that if at least one temperature differs from the mean value a signal is released at the output of the differential voltage comparator, and a changeover switch and a stepping mechanism, the selector switch steps on automatically after each revolution of the monitored engine by means of the said change-over switch actuated by the stepping mechanism.

References Cited

UNITED STATES PATENTS

| | | | |
|---|---|---|---|
| 2,231,845 | 2/1941 | Curran | 73—346 X |
| 3,101,617 | 8/1963 | Brinson | 73—346 X |
| 3,318,151 | 5/1967 | Behrendt et al. | 73—346 |

RICHARD C. QUEISSER, Primary Examiner

JERRY W. MYRACLE, Assistant Examiner

U.S. Cl. X.R.

73—346